May 21, 1940.  A. J. BUNDY  2,201,286

MANUFACTURE OF SHEET GLASS

Filed May 4, 1938   2 Sheets-Sheet 1

INVENTOR
Albert J. Bundy

May 21, 1940.　　　A. J. BUNDY　　　2,201,286
MANUFACTURE OF SHEET GLASS
Filed May 4, 1938　　　2 Sheets-Sheet 2
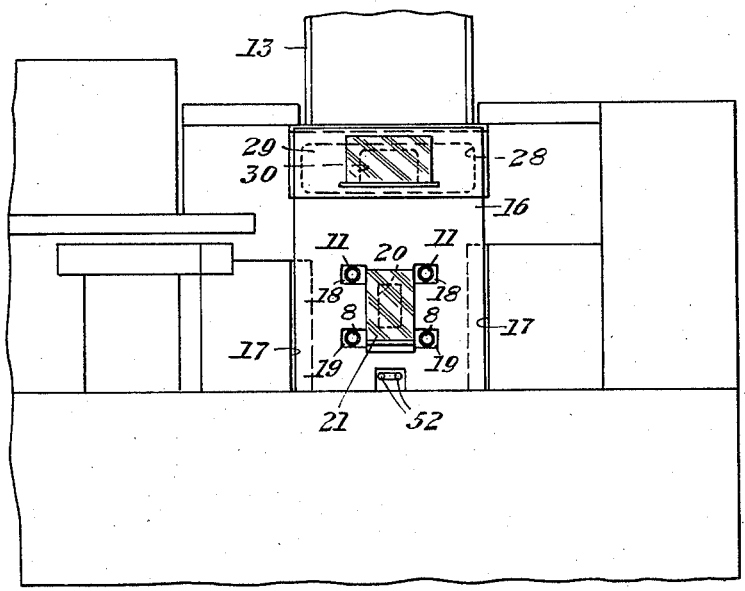
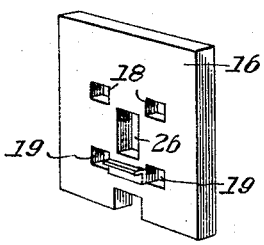
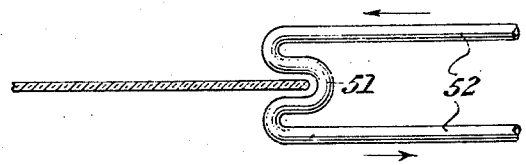
INVENTOR
Albert J. Bundy Patented May 21, 1940

2,201,286

UNITED STATES PATENT OFFICE 2,201,286

MANUFACTURE OF SHEET GLASS

Albert J. Bundy, Jeannette, Pa., assignor to American Window Glass Company, Pittsburgh, Pa., a corporation of Pennsylvania Application May 4, 1938, Serial No. 205,941

5 Claims. (Cl. 49—83.1)

The present invention relates broadly to the manufacture of sheet glass by continuous drawing from a bath of molten glass. It provides a method and apparatus whereby the characteristic waves and other similar defects which have always been present in drawn glass sheets may be reduced to an appreciable extent.

In the presently known processes of manufacturing sheet glass a bath of molten glass is provided in a drawing chamber and a continuous sheet of glass drawn therefrom by means of appropriate drawing and setting apparatus. In all of such processes the glass sheet is drawn vertically from the bath and travels vertically for at least a short distance and during this vertical travel the glass sheet becomes at least partially set. In some of these processes the glass sheet is drawn from the molten bath and continues vertically through the drawing chamber and then continues vertically through a rather long lehr positioned above the chamber, while in another of such processes, the glass sheet is drawn from the bath of glass and passes vertically through only a part of the drawing chamber and then is turned horizontally over a suitable roll and then passes horizontally through a lehr where it is cooled and annealed and then cut to suitable size. The present invention is applicable to these processes and to any other processes wherein the glass sheet is drawn from a bath of molten glass.

In all of these processes as practiced heretofore the glass produced has a characteristic wave extending longitudinally, and sometimes latitudinally, of the rising glass sheet and has other defects therein such as batter which render it not as acceptable for certain purposes as what is known as plate glass, i.e., glass which has been ground and polished to a high finish. Such defects cause distortion of objects viewed therethrough, and this is particularly apparent where the objects are viewed at a relatively sharp angle.

Heretofore many attempts have been made to eliminate this distortion caused by waves and batter without otherwise detrimentally affecting the finished product. In some instances slightly better results have been obtained, but in no case of which I have knowledge has any such attempt resulted in the production of a drawn glass sheet in which the characteristic waves and batter have been materially reduced.

By the present invention I provide a method and apparatus for manufacturing drawn glass sheets whereby the defects above mentioned are greatly reduced or are substantially eliminated from an appreciable portion of the rising glass sheet and confined to a relatively narrow section along one edge thereof which may be readily cut from the formed sheet without any substantial waste. This is accomplished without in any way detrimentally affecting the resulting product. The product of my invention not only has less of the characteristic wave and batter of drawn glass, but the surfaces thereof have the usual fine fire-polish of drawn glass. Furthermore, the product of my invention is formed without detrimentally affecting the character of the annealing in the finished sheet, as only a small amount of strain is in the finished product and this strain is distributed uniformly throughout the glass sheet. The annealing process of the Monro Patent No. 2,002,544 may be practiced as the use of the present invention does not interfere therewith.

I have found that the flow of air and other gases in the drawing chamber at and a relatively short distance above the meniscus of the rising glass sheet very materially affects the character of the drawn sheet and that by properly controlling the flow of such gases waves and batter may be substantially reduced and the fine fire-polish of drawn glass retained. I have found that these results can be accomplished by providing and maintaining a flow of gases adjacent or at the meniscus travelling transversely of and in contact with the rising glass sheet, the flow of gases extending from one edge of the rising glass sheet substantially to the other edge and being provided and maintained on both faces of the rising sheet and traveling in the same direction on each side of the sheet. By providing such a transverse flow of a gas along or adjacent to the meniscus the temperature of the air which contacts the rising glass sheet at this point is rendered more uniform and this in turn renders more uniform the temperatures across the sheet at this point. Furthermore, by providing this positive transverse flow of gas along the meniscus stray gas currents which may cause waves or batter if allowed to contact the glass sheet at this point are caused to join the transverse flow and are consequently prevented from causing vertically extending cold air currents along the rising sheet.

The flow of gas transversely of the rising glass sheet from edge to edge thereof at or adjacent the meniscus and in the same direction on both sides of the sheet may be obtained in any suitable manner. It may be obtained by effecting such circulation of the gaseous medium already in the drawing chamber. It may be, and preferably is, obtained by closing one end of the chamber against any substantial ingress of air which may contact the sheet at or adjacent the meniscus and by providing for the ingress of air or other gas at the other or open end of the chamber, the air or other gas being permitted to enter the chamber at points where it will travel to the meniscus and flow along or adjacent to the meniscus on both sides of the rising glass sheet from one edge thereof substantially to the other edge thereof. Or, it may be provided in any other manner suitable to the particular process of drawing sheet glass to which it is applied.

It is apparent from what has been stated above that my invention is not limited to any particular method of manufacturing sheet glass and that it may be applied to any process wherein the sheet is drawn from a bath of molten glass. However, hereinafter, for purposes of illustration only, it will be described as applied to the Fourcault process.

Heretofore in the operation of Fourcault machines it has always been considered essential to admit air at each end of the drawing chamber to regulate the draw. Consequently on each end of such apparatus inlets have heretofore been provided at or about the level of the coolers and also above the coolers on both ends of the drawing chamber. Air has been permitted to enter such openings on both ends so as to obtain proper drawing of the glass sheet. However, I have discovered that by closing one end of the chamber so as to prevent ingress of any substantial amount of air which may contact the meniscus and by maintaining open one or more of the inlets on the other end of the pit, I can provide a flow of air transversely of the rising glass sheet at or adjacent the meniscus and in the same direction on both faces of the glass sheet which effectually reduces the waves in the rising glass sheet. As the air currents approach the closed end of the drawing chamber they circulate upwardly along the edge of the glass sheet and then pass into the lehr. The characteristic wave of the glass is driven to adjacent the edge of the rising glass sheet so that a very large portion of the entire sheet is relatively free of the objectionable waves.

When the air which normally enters the drawing chamber is blocked off as above described, the drawing of the glass sheet may be detrimentally affected in that the edge adjacent the closed end will move inwardly of the chamber or will not be regular; that is, it will snake. This is particularly true when edge holding means is not utilized. Accordingly, in accordance with my invention I propose to utilize edge holding means on the closed end of the drawing chamber to hold the sheet to width. Such edge holding means may be in the form of coolers or edge rolls or any of the other well known devices.

In the accompanying drawings I have shown for purposes of illustration only a preferred embodiment of my invention. It will be understood, however, that my invention is not limited to the particular embodiment shown in the drawings as it may be practiced in numerous different ways and embodied in numerous different types of apparatus.

In the drawings—

Figure 3 is an elevational view showing the closed end of the drawing chamber shown in Figures 1 and 2;

Figure 4 is a detail of the cover shown in Figure 3 through which the pipes for the coolers and the air opening extend; and Figure 5 is a detail of the cooler shown in Figure 1.

Figure 1:
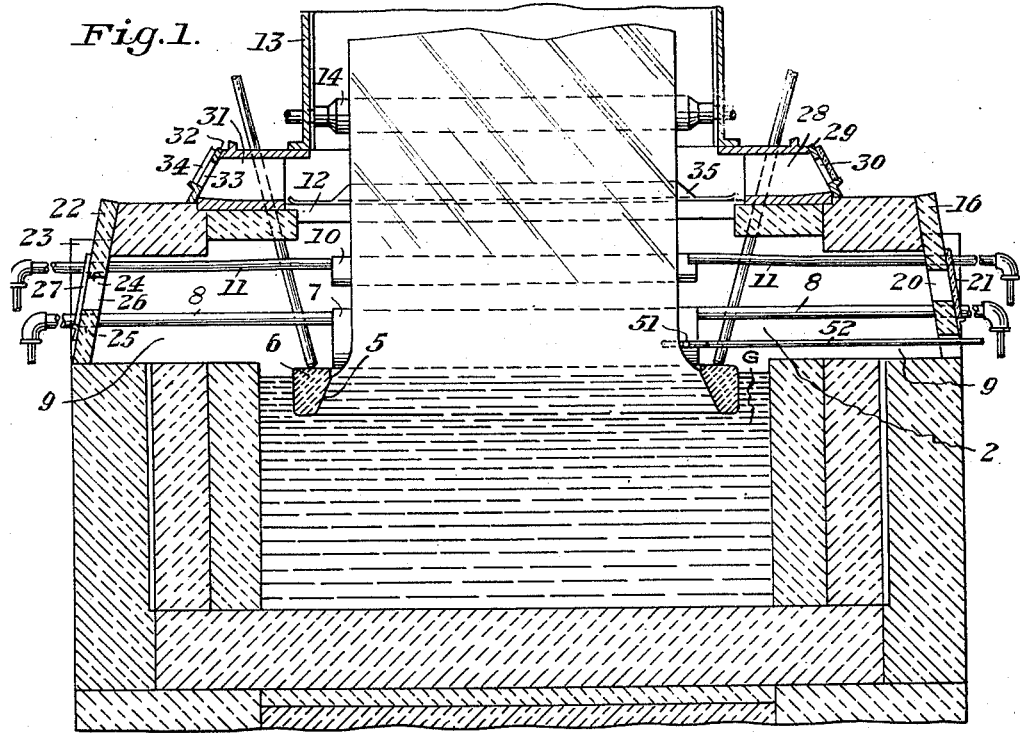
Figure 1 is a longitudinal section through a drawing chamber.
Figure 2:
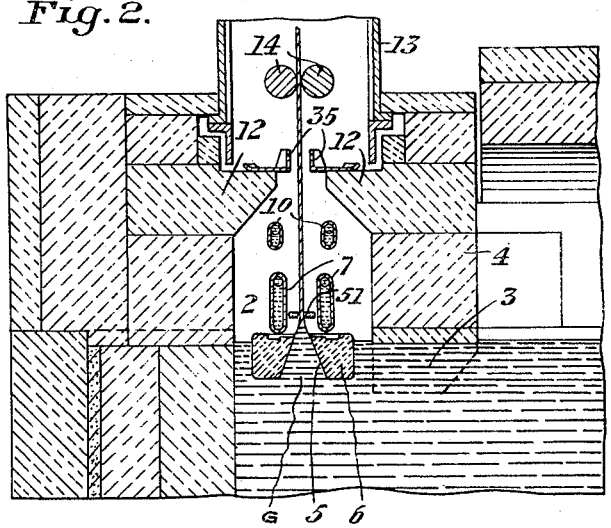
Figure 2 is a transverse section through the drawing chamber shown in Figure 1.

As shown in the drawings the molten glass G is fed to the drawing chamber 2 through a canal 3 which is connected in the usual manner to the melting tank. In its passage from the canal 3 into the drawing chamber 2 the molten glass passes beneath the bridge wall 4 which forms one of the walls of the drawing chamber. The molten glass in the drawing chamber passes upwardly through a longitudinally extending slot 5 in a debiteuse 6 which extends throughout substantially the length of the drawing chamber. The glass sheet is drawn through the slot upwardly past the main water coolers 7, one of which is provided on each side of the rising glass sheet and both of which are positioned only a relatively short distance above the debiteuse. Water is fed to and discharged from these coolers by means of pipes 8 which extend throughout openings 9 in the end walls of the chamber. The glass sheet continues upwardly through the drawing chamber 2 past auxiliary water coolers 10 which are likewise provided with water supply and discharge pipes 11. These water supply and discharge pipes for the auxiliary coolers likewise extend through the openings 9 in the end walls of the chamber. The glass sheet then continues upwardly through the drawing chamber past the so-called 49-blocks 12 and into a vertically extending lehr 13 which is provided with a plurality of pairs of rolls 14 for carrying the sheet vertically through the lehr.

The lower opening 9 on the right side of the drawing chamber as viewed in Figure 1 is normally provided with a closure 16 of refractory material, this closure being positioned in the mitered section of the side wall indicated by the reference character 17. This closure 16 is provided with openings 18 for the passage of the water pipes for the auxiliary coolers and with openings 19 for the water pipes of the main coolers. In addition, this closure is provided with a centrally disposed opening 20 provided with a glass window 21 for viewing the conditions in the chamber. This window is maintained closed so that gas cannot enter this end of the drawing chamber, which is referred to herein as the closed end.

The opposite or open end of the drawing chamber is provided with a closure 22 for partially closing the lower opening 9 on this side of the chamber. This closure is mounted in the mitered section 23 of the side wall and is provided with openings 24 for the passage of the auxiliary cooler pipes and openings 25 for the passage of the main cooler pipes. A centrally disposed inlet 26 is provided in the closure for admitting air or other gaseous medium to the drawing chamber. A shutter 27 may be provided for cooperation with this opening for regulating the amount of air supplied to the drawing chamber through this opening.

An opening 28 is normally provided on what I have termed the closed end of the pit for permitting ingress of air in the base of the lehr. This opening 28 on the closed end of the drawing chamber is preferably closed so that gas is not permitted to enter the drawing chamber on this side, a closure plate 29 having an observation window 30 being provided for this purpose. A similar opening 31 is provided on the open end in the base of the lehr. This opening is provided with a closure plate 32 having an opening 33 therein which is provided with a shutter 34 which is adjustable to regulate the amount of gas permitted to enter the base of the lehr on this side of the structure.

As has been pointed out above, in accordance with my invention the opening 26 and, at times, the opening 31 are adjusted to permit the proper amount of air to enter the drawing chamber on the open end thereof and the lower opening normally provided on the other end of the pit is completely closed off and the upper opening on this end is also preferably closed off so as to prevent any gas from entering the chamber at this closed end. By this arrangement I control the gas flow in the chamber so as to provide a unidirectional flow of air on both sides of the rising glass sheet along the meniscus from one edge of the sheet substantially to the other edge thereof. Regulation of the quantity of air admitted to the drawing chamber at the open end thereof can be effected so as to obtain the proper flow along the meniscus for any given operating condition. As has been pointed out above, where this method of closing one end of the chamber and maintaining the other end open is carried out, the characteristic wave of ordinary drawn glass is materially reduced.

An angle 35 is normally provided on each side of the rising glass sheet immediately above the so-called 49-blocks. These angles normally rest on the 49-blocks and extend outwardly therefrom toward the rising glass sheet so as to further restrict the area between the opposing faces of the 49-blocks. Normally these angles extend parallel throughout their length longitudinally of the drawing chamber. However, I have found that somewhat improved results can be obtained by adjusting these angles so that they are spaced apart a relatively short distance at the open end of the chamber and spaced apart to a greater extent at the closed end of the chamber. For example, I have found that a spacing of approximately one inch at the open end of the chamber and a spacing of approximately four inches at the closed end of the chamber gives satisfactory results. The wide spacing at the closed end of the chamber permits the gas, after flowing transversely as described, to escape into the lehr without the generation of a detrimental gas flow adjacent the edge of the sheet.

Where this transverse flow is effected in the manner described, it is necessary to provide means for holding the sheet to width on the closed end of the pit. This is true only where none of the usual edge-holding means is used, such as edge rolls. In Figure 5 I have shown an auxiliary cooler 51 which may be used for this purpose. This cooler is provided with a U-shaped section which extends about the edge of the sheet with appropriate water supply pipes 52 which extend through an end of the drawing chamber to a suitable water supply.

It will be obvious to those skilled in this art that various different modifications of the apparatus employed may be made and the advantages of my invention obtained. However, I deem it essential that a relatively uniform flow of air or other fluid be provided at the meniscus, this flow being transversely of the rising glass sheet along or adjacent the meniscus and in the same direction on both faces of the sheet.

I claim:

1. In the method of forming a glass sheet by continuous drawing from a bath of molten glass, the steps comprising forming the sheet by drawing it from the bath, and circulating a gas in contact with both faces of the glass sheet in the same direction transversely of the glass sheet from one edge thereof substantially to the other edge thereof before the glass becomes set.

2. In the method of forming a glass sheet by continuous drawing from a chamber containing a bath of molten glass, the steps comprising forming the sheet by drawing it vertically from the bath, supplying a gas to the drawing chamber, said glass being cooler than the rising glass sheet adjacent the meniscus, and circulating said gas in contact with both faces of the glass sheet in the same direction transversely of the glass sheet from one edge thereof substantially to the other edge thereof adjacent the meniscus.

3. In the method of forming a glass sheet by continuous drawing from a chamber containing a bath of molten glass, the steps comprising forming the sheet by drawing it vertically from the bath, maintaining one end of the chamber substantially air-tight against ingress of air, supplying a gas to the other end of the chamber, and circulating said gas in contact with both faces of the glass sheet in the same direction transversely of the glass sheet from one edge thereof substantially to the other edge thereof adjacent the meniscus.

4. In the method of forming a glass sheet by continuous drawing from a bath of molten glass, the steps comprising forming the sheet by drawing it vertically from the bath, maintaining a flow of gas adjacent the meniscus traveling transversely of the rising glass sheet, the flow of gas extending from one edge of the rising glass sheet substantially to the other edge and the circulated gas being in contact with and flowing in the same direction along each face of the sheet, and holding the sheet to width by cooling the latter edge thereof.

5. In the method of forming a glass sheet by continuous drawing from a chamber containing a bath of molten glass, the steps comprising forming the sheet by drawing it vertically from the bath, supplying a gas to one end of the chamber, said gas being cooler than the rising glass adjacent the meniscus, circulating said gas in contact with both faces of the glass sheet in the same direction transversely of the glass sheet from one edge thereof to substantially the other edge thereof adjacent the meniscus, and holding to width the edge of the glass sheet adjacent the end of the chamber opposite the end at which said gas is supplied.

ALBERT J. BUNDY.